United States Patent [19]
Kojina et al.

[11] Patent Number: 5,306,770
[45] Date of Patent: Apr. 26, 1994

[54] THERMOPLASTIC RESIN COMPOSITIONS AND PROCESS FOR PRODUCING THE SAME

[75] Inventors: Junji Kojina; Akio Matsuda, both of Yokkaichi; Yasunori Asano, Mie; Tateki Furuyama, Yokkaichi, all of Japan

[73] Assignee: Japan Synthetic Rubber Co., Ltd., Tokyo, Japan

[21] Appl. No.: 770,778

[22] Filed: Oct. 4, 1991

Related U.S. Application Data

[63] Continuation of Ser. No. 493,246, Mar. 14, 1990, abandoned.

[30] Foreign Application Priority Data

Mar. 16, 1989 [JP] Japan ................... 1-064878

[51] Int. Cl.$^5$ ............... C08L 51/04; C08L 51/06; C08L 51/08; C08L 55/02
[52] U.S. Cl. ........................ 525/68; 525/64; 525/66
[58] Field of Search .............. 525/64, 68, 66

[56] References Cited

FOREIGN PATENT DOCUMENTS 197387 10/1986 European Pat. Off. .
284086 9/1988 European Pat. Off. .
295706 12/1988 European Pat. Off. ........... 525/64
314188 5/1989 European Pat. Off. .

*Primary Examiner*—Patricia A. Short
*Attorney, Agent, or Firm*—Oblon, Spivak, McClelland, Maier & Neustadt

[57] ABSTRACT

A thermoplastic resin composition which comprises:

(A) 45-90% by weight of a rubber-modified thermoplastic styrene resin in which the grafting degree is 40-150% by weight based on the weight of the rubbery polymer, (B) 9.5-54.5% by weight of an aromatic polyester having an intrinsic viscosity of 1.1-2 dl/g as measured at 25° C. in o-chlorophenol, and (C) 0.1-20% by weight of a graft copolymer obtained by graft-copolymerizing a monomer mixture consisting of 60-80% by weight of an aromatic alkenyl compound and 20-40% by weight of an alkenyl cyanide compound on a copolymer consisting essentially of an olefin unit and an epoxy group-containing unsaturated compound unit, and (D) optionally a silicone lubricant in a proportion of 5-20,000 ppm of the total weight of the (A), (B) and (C) components. Said thermoplastic resin composition can be prepared by previously mixing a part or the whole of the (B) component, a part or the whole of the (C) component and 0-20% by weight of the (A) component, and then mixing the resulting mixture with the remaining component or components.

27 Claims, No Drawings

THERMOPLASTIC RESIN COMPOSITIONS AND PROCESS FOR PRODUCING THE SAME

This application is a continuation of application Ser. No. 07/493,246, filed on Mar. 14, 1990, now abandoned.

This invention relates to a thermoplastic resin composition excellent in chemical resistance, impact resistance, molded article appearance and the like and a process for producing the same.

Thermoplastic aromatic alkenyl compound resins, particularly rubber-modified thermoplastic styrene resins, have heretofore been used in various fields such as electric products and the like because they are light in weight and excellent in moldability.

However, the rubber-modified thermoplastic styrene resins are not always stable in organic solvents, and particularly when they are used under stress or in the deformation state, their chemical resistance is remarkably reduced in many cases. This has become a bar when the rubber-modified thermoplastic styrene resins have been intended to be utilized in a wider field.

When a machine oil is attached to a rubber-modified thermoplastic styrene resin, stress cracks are caused in the rubber-modified thermoplastic styrene resin in some cases and an attempt has been made to solve this problem.

In order to enhance the chemical resistance of a rubber-modified thermoplastic styrene resin, it has been tried to increase the molecular weight of the resin or introduce a polar group-containing monomer such as an alkenyl cyanide compound, a (meth)acrylic acid ester or the like into the polymer. However, these methods have not enabled sufficient chemical resistance to be imparted to the resins.

Also, blending an aromatic polyester therewith can be one of the methods of improving the chemical resistance of a rubber-modified thermoplastic styrene resin. However, the balance between chemical resistance and impact resistance is not good enough, and the appearance of a molded product near a gate is inferior.

The present inventors have made extensive research to solve the above-mentioned problems, and as a result, found that a thermoplastic resin composition having excellent chemical resistance and impact resistance and capable of imparting excellent appearance to a molded article thereof can be obtained by incorporating into a rubber-modified thermoplastic styrene resin an aromatic polyester and a specific graft copolymer in a specific proportion.

According to this invention, there is provided a thermoplastic resin composition which comprises:

(A) 45–90% by weight of a rubber-modified thermoplastic styrene resin in which the grafting degree is 40–150% by weight based on the weight of the rubbery polymer, (B) 9.5–54.5% by weight of an aromatic polyester having an intrinsic viscosity of 1.1–2 dl/g as measured at 25° C. in o-chlorophenol, and (C) 0.2–20% by weight of a graft copolymer obtained by graft-copolymerizing a monomer mixture consisting of 60–80% by weight of an aromatic alkenyl compound and 20–40% by weight of an alkenyl cyanide compound on a copolymer consisting essentially of an olefin unit and an epoxy group-containing unsaturated compound unit.

This invention further provides a process for producing the above thermoplastic resin composition which comprises previously mixing a part or the whole of the above (B) component, a part or the whole of the above (C) component and 0–20% by weight of the above (A) component and then mixing the resulting mixture with the remaining component or components.

The components used in the thermoplastic resin composition of this invention are explained in detail below.

(1) Rubber-Modified Thermoplastic Styrene Resin which is the (A) Component in this Invention The rubber-modified thermoplastic styrene resin used as the (A) component in this invention is a rubber-modified styrene polymer or a mixture of a rubber-modified styrene polymer with a styrene polymer (unmodified with rubber), in which a rubbery polymer is dispersed in a styrene polymer for the purpose of obtaining high impact resistance. This mixing method may be a simple mechanical blending method; however, in order to obtain a good compatibility, a so-called graft-copolymerization method is more perferable in which a styrene monomer and the like are graft-copolymerized in the presence of a rubbery polymer. A graft-blending method may also be preferred in which the rubber-modified styrene polymer (graft-copolymer) obtained by the graft-copolymerization method is mixed with a styrene polymer which has been obtained by a separate method.

The above rubbery polymer includes diene polymers such as polybutadiene, styrene-butadiene copolymer and the like; non-diene polymers such as hydrogenated styrene-butadiene block copolymer, acrylic copolymer, ethylene-propylene copolymer, chlorinated polyethylene, polyurethane and the like. Among them, polybutadiene is preferred.

The above styrene monomer includes aromatic alkenyl compounds such as styrene, α-methylstyrene, bromostyrene and the like. Styrene and/or α-methylstyrene are most preferably used.

If necessary, other copolymerizable monomers may be copolymerized with the styrene monomer. Such copolymerizable monomers include alkenyl cyanide compounds such as acrylonitrile, methacrylonitrile and the like; N-cyclohexylmaleimide; N-phenylmaleimide; methyl methacrylate; and the like. In general, when a styrene monomer is used alone, sufficient impact resistance is not obtained, and therefore, acrylonitrile is preferably copolymerized with the styrene monomer. In this case, the proportion of the aromatic alkenyl compound to the alkenyl cyanide compound is preferably 60-90/10-40 (by weight), more preferably 65-85/15-35 (by weight).

The above rubber-unmodified styrene polymer includes acrylonitrile-styrene copolymer (AS resin), methyl methacrylate-styrene copolymer, n-butyl acrylate-butylene copolymer, acrylonitrile-α-methylstyrene copolymer and the like. Among them, AS resin is preferred.

In the (A) component, the proportion of the rubber-unmodified styrene polymer used is preferably 5–95% by weight, more preferably 10–90% by weight, most preferably 30–70% by weight.

The methyl ethyl ketone-soluble portion of the AS resin used as the rubber-unmodified styrene polymer has preferably an intrinsic viscosity $[\eta]$ of 0.2–1.2 dl/g as measured at 30° C. in methyl ethyl ketone, more preferably an intrinsic viscosity of 0.3–1 dl/g as measured as 30° C. in methyl ethyl ketone (hereinafter, the intrinsic viscosity is referred to as $[\eta]$ 30° C. MEK). In this case, the proportion of the aromatic alkenyl compound to the alkenyl cyanide compound is preferably 60-90/10-40 (by weight), more preferably 65-85/15-35 (by weight).

The rubber-modified thermoplastic styrene resins thus obtained include, specifically, conventional acrylonitrile-butadiene-styrene resin (ABS resin), acrylonitrile-ethylene-propylene-styrene resin (AES resin), methyl methacrylate-butadiene-styrene resin (MBS resin), acrylonitrile-butadiene-methyl methacrylate-styrene resin, acrylonitrile-n-butyl acrylate-styrene resin (AAS resin), rubber-modified polystyrene [high impact polystyrene (HIPS)], heat-resistant rubber-modified styrene resin in which α-methylstyrene is used, and styrene-grafted copolymer modified with a styrene-butadiene block copolymer or a hydrogenation product thereof.

The above-mentioned rubber-modified thermoplastic styrene resin may be produced by emulsion polymerization, solution polymerization, bulk polymerization, suspension polymerization or the like.

The method of producing the rubber-modified thermoplastic styrene resin comprises graft-polymerizing a styrene monomer or styrene monomers and, if necessary, other monomers in the presence of a rubbery polymer such as polybutadiene or the like to obtain a graft copolymer containing ungrafted styrene polymer, or mixing the graft copolymer with a styrene polymer obtained by polymerizing a styrene monomer and, if necessary, other monomers in the absence of a rubbery polymer.

The rubber content in the rubber-modified thermoplastic styrene resin is preferably 5-40% by weight, more preferably 10-30% by weight.

The methyl ethyl ketone-soluble portion of the rubber-modified thermoplastic styrene resin has an intrinsic viscosity of 0.2-1.2 dl/g, preferably 0.3-1.0 dl/g as measured in methyl ethyl ketone at 30° C. (hereinafter referred to as [η] 30° C. MEK).

In the graft polymer in the rubber-modified thermoplastic styrene resin, the proportion of the resin component grafted directly on the rubber component based on the weight of the rubber component (hereinafter referred to as grafting degree) is measured by solvent-fractionation using acetone, and determined from the following equation:

$$\text{Grafting degree} = \frac{(b) - (a)}{(a)} \times 100$$

in which (a) is the rubber content in the rubber-modified styrene polymer and (b) is the acetone-insoluble matter content in the rubber-modified styrene polymer.

When the grafting degree is 40-150%, the balance between chemical resistance and impact resistance of the resin is better. The grafting degree is preferably 45-140%, more preferably 50-130% and most preferably 60-120%.

When the amount of α-methylstyrene in the rubber-modified thermoplastic styrene resin is 25-70% by weight, the balance between chemical resistance and impact resistance of the resulting resin is much better.

(2) Aromatic Polyester Used as the (B) Component in This Invention

The aromatic polyester used as the (B) component in this invention may be a polyester obtained by condensing a diol with an aromatic dicarboxylic acid or its ester or a derivative thereof capable of forming the ester in a known manner.

The aromatic dicarboxylic acid includes naphthalene dicarboxylic acids such as naphthalene-2,6-dicarboxylic acid and the like; terephthalic acid; isophthalic acid; p-hydroxybenzoic acid; adipic acid; and sebacic acid and also their derivatives capable of forming the ester.

The above diol includes polymethylene glycols having 2-6 carbon atoms such as ethylene glycol, 1,4-butanediol, 1,6-hexanediol and the like; 1,4-cyclohexanediol; and bisphenol-A and also their derivatives capable of forming the ester.

The aromatic polyester thus obtained includes polyethylene terephthalate (PET), polybutylene terephthalate (PBT), bisphenol-A isophthalate and the like. Among them, PBT is preferable.

The aromatic polyester has an intrinsic viscosity of 1.1-2 dl/g, preferably 1.1-1.5 dl/g and more preferably 1.1-1.4 dl/g, as measured at 25° C. in o-chlorophenol (hereinafter referred to as [η] 25° C. o-chlorophenol). When the intrinsic viscosity falls within this range, the balance of impact resistance and chemical resistance is excellent.

(3) The Graft Copolymer used as the (C) Component in this Invention

The graft copolymer used as the (C) component in this invention is a graft copolymer having a multiphase structure obtained by graft-polymerizing a monomer mixture consisting of 60-80% by weight of an aromatic alkenyl compound and 20-40% by weight of an alkenyl cyanide compound on the main chain copolymer obtained by copolymerizing a monomer mixture consisting essentially of an olefin compound and an epoxy group-containing unsaturated compound.

The olefin compound used in the main chain copolymer includes, for example, ethylene, propylene, butene-1 and the like. Ethylene is preferably used.

The epoxy group-containing unsaturated compound includes unsaturated glycidyl esters, unsaturated glycidyl ethers, epoxyalkenes, p-glycidyl-styrenes and the like. Glycidyl methacrylate is particularly preferred.

The weight ratio of the olefin compound to the epoxy group-containing unsaturated compound in the main chain copolymer, that is, the weight ratio of olefin component to the epoxy group-containing unsaturated compound component is preferably 99.9:0.1 to 60:40, more preferably 97:7 to 70:30.

The component to be grafted on the main chain copolymer is a monomer mixture of 60-80% by weight of an aromatic alkenyl compound and 20-40% by weight of an alkenyl cyanide compound. When the proportion of the aromatic alkenyl compound is less than 60% by weight or more than 80% by weight, or when the proportion of the alkenyl cyanide compound is more than 40% by weight or less than 20% by weight, the impact resistance becomes inferior in any case.

The aromatic alkenyl compound includes, for example, styrene, α-methylstyrene and the like.

The alkenyl cyanide compound includes, for example, acrylonitrile, methacrylonitrile and the like.

In the production of the graft copolymer which is the (C) component in this invention, the weight ratio of the main chain copolymer component to the grafted polymer component is preferably 95:5 to 30:70.

The graft copolymer which is the (C) component in this invention can be preferably produced by a method in which, for example, a styrene-acrylonitrile copolymer having an —O—O— linkage in the molecule is addition-reacted with an olefin copolymer, a method in which, for example, a copolymer of a radically polymerizable unsaturated compound having a peroxide linkage, an aromatic alkenyl compound and an alkenyl cyanide compound is subjected, together with an ethylene-epoxy group-containing unsaturated compound copolymer, to radical addition reaction in an extruder or in the form of a solution, or a method in which a monomer mixture consisting of an aromatic aleknyl compound and an alkenyl cyanide compound is graft-polymerized on an olefin copolymer.

The proportions of the components contained in the thermoplastic resin composition of this invention, the mixing method and components which are optionally added are explained below.

Proportion of (A), (B) and (C) in the Thermoplastic Resin Composition

The rubber-modified thermoplastic styrene resin which is the (A) component is contained in a proportion of 45–90% by weight, preferably 50–84% by weight, more preferably 54–74.5% by weight in the composition. When the proportion is less than 45% by weight, the impact resistance of the resulting resin becomes low. When the proportion exceeds 90% by weight, the chemical resistance of the resulting resin becomes low.

The proportion of the aromatic polyester which is the (B) component in the thermoplastic resin composition of this invention is 9.5–54.5% by weight, preferably 15–49% by weight, more preferably 25–40% by weight. When the proportion is less than 9.5% by weight, the chemical resistance of the resulting resin becomes low. When the proportion exceeds 54.5% by weight, the impact resistance of the resulting resin becomes low.

The graft copolymer which is the (C) component is contained in a proportion of 0.2–20% by weight, preferably 0.5–15% by weight, more preferably 0.7–10% by weight and most preferably 1–6% by weight in the thermoplastic resin composition of this invention. When the proportion is less than 0.2% by weight or exceeds 20% by weight, the impact resistance of the resulting resin becomes inferior.

A silicone lubricant (D) may optionally be contained in the composition consisting of the (A), (B) and (C) components, and in this case, the impact resistance is remarkably increased. The silicone lubricant includes, for example, polydimethylsiloxane, polymethylphenylsiloxane and the like. Polydimethylsiloxane is preferred, and that having a viscosity of 90–13,000 cP at 23° C. is more preferable. The silicone lubricant (D) is added in a proportion of not more than 20,000 ppm, preferably 10–15,000 ppm, more preferably 50–10,000 ppm and most preferably 100–5,000 ppm of the total weight of the (A), (B) and (C) components. When the proportion exceeds 20,000 ppm, the impact resistance becomes inferior.

The (A), (B) and (C) components are preferably mixed by such a method that a part or the whole of the (B) component and a part or the whole of the (C) component and 0–20% by weight of the (A) component (hereinafter referred to as the former stage components) are previously mixed and the resulting mixture is mixed with the remaining component or components. This method enables the thermoplastic resin composition of this invention to have excellent properties.

In the production process of this invention, it is preferable that the former stage components are mixed using a mixer and a mixing operation which will be explained hereinafter, and the resulting mixture is mixed with the remaining component or components using an apparatus which will be explained hereinafter.

Mixer and Mixing Operation

The mixer for producing the thermoplastic resin composition of this invention is not critical; however, there may be used various mixers which are conventionally used for the production of general thermoplastic resins, such as Banbury mixer, Brabender Plastomill, kneader, vented extruder and the like. Among them, vented extruder is preferably used.

The form of each of the components is not critical, and the components may be mixed in any form such as pellets, beads, powder, flakes and the like, and it is necessary that the mixing temperature be not lower than the melting point of the aromatic polyester. On the other hand, the rubber-modified thermoplastic resin is thermally instable at temperatures exceeding 300° C., and therefore, the mixing temperature is preferably 230°–300° C.

Other Compounding Agents

The thermoplastic resin composition of this invention may contain, if necessary, a compounding agent and an additive which are usually used in this type of thermoplastic resin composition, for example, a lubricant, an electrostatic agent, an antioxidant, a flame-retarder, an ultraviolet absorber, an antiphotooxidant, a coloring agent, an inorganic filler such as glass fiber and the like.

Moreover, other polymers such as polyamide, polyethylene, polypropylene, polysulfone, polyethersulfone, polycarbonate, polyimide, PPS, polyetheretherketone, vinylidene fluoride polymer, polyphenylether and the like may be blended depending upon the properties required. When, for example, a polycarbonate is blended with the composition in a proportion of 1–10% by weight, the resulting composition has better impact resistance.

The thermoplastic resin composition of this invention can be formed into various molded articles by injection molding, sheet extrusion, vacuum forming, profile extrusion, expansion molding or the like. The molded articles can be applied to various parts of electric and electronic appliances, housings and others.

This invention is further explained in more detail below referring to Examples. However, the Examples are by way of illustration and not by way of limitation. In the examples, % is by weight unless otherwise specified.

The (A), (B), (C) and (D) components used in the the Examples and Comperative Examples are as follows:

The (A) component is a mixture of (1) the following rubber-modified styrene polymer and (2) the following rubber-unmodified styrene polymer:

(1) Rubber-Modified Styrene Polymer

G-1: ABS resin consisting of 50% of polybutadiene, 10% of styrene-butadiene copolymer, 30% of styrene and 10% of acrylonitrile having a grafting degree of 50% and an intrinsic viscosity $[\eta]$ 30° C. MEK of 0.5 dl/g.

G-2: ABS resin consisting of 30% of polybutadiene, 10% of styrene-butadiene copolymer, 45% of styrene and 15% of acrylonitrile having a grafting degree of 100% and an intrinsic viscosity $[\eta]$ 30° C. MEK of 0.5 dl/g.

G-3: ABS resin consisting of 12% of polybutadiene, 5% of styrene-butadiene copolymer, 27% of styrene, 35% of α-methylstyrene and 21% of acrylonitrile having a grafting degree of 100% and an intrinsic viscosity [η] 30° C. MEK of 0.5 dl/g.

G-4: ABS resin consisting of 50% of polybutadiene, 10% of styrene-butadiene copolymer, 30% of styrene and 10% of acrylonitrile having a grafting degree of 35% and an intrinsic viscosity [η] 30° C. MEK of 0.5 dl/g.

G-5: ABS resin consisting of 25% of polybutadiene, 5% of styrene-butadiene copolymer, 52% of styrene and 18% of acrylonitrile having a grafting degree of 200% and an intrinsic viscosity [η] 30° C. MEK of 0.5 dl/g.

(2) Rubber-Unmodified Styrene Polymer

M-1: AS resin consisting of 5% of styrene, 25% of acrylonitrile and 70% of α-methyl-styrene having an intrinsic viscosity [η] 30° C. MEK of 0.33 dl/g.

The (B) Component

B-1: PBT resin manufactured by Polyplastics K.K. (trade name: Duranex XD477 and [η] 30° C. MEK: 1.2 dl/g)

The (C) Component

C-1: A graft copolymer in which a styrene-acrylonitrile copolymer (styrene/acrylonitrile=70/30 by weight) is grafted on an ethylene-glycidyl methacrylate (hereinafter referred to as GMA) copolymer (ethylene/GMA=85/15 by weight) (ethylene+GMA/styrene-acrylonitrile copolymer=70/30 by weight)

The (D) Component

D-1: Polydimethylsiloxane

Evaluation Test Method (i) Chemical Resistance

An ASTM No. 1 dumbbell was bent so that the strain became 1.0% and fixed on a means and carbitol (Chem. A) or salad oil (Chem. B) were coated thereon and allowed to stand in an atmosphere at 23° C. for one week, after which the state of crack was visually evaluated using the following ratings:

A: No cracks were formed.
B: A few microcracks were formed.
C: Many microcracks were formed.
D: Large cracks were formed or the sample was broken.

(ii) Impact Resistance

A test plate of 2.54 mm in thickness (150×150 mm) was put on a supporting stand having a hole of 25.4 mm in diameter and a weight of 12.7 mm in R was allowed to fall thereon to measure the total energy required to break the plate.

(iii) Moldability

Measured in accordance with ASTM D1238 at 240° C. under a load of 10 kg.

EXAMPLES 1 TO 7 AND COMPARATIVE EXAMPLES 1 TO 4

Each of the components indicated in the compounding recipe of Table 1 was used in the following manner to obtain a thermoplastic resin composition:

First of all, the (B) and (C) components were kneaded using a single screw extruder at 230° C. to obtain pellets. Subsequently, the pellets and the (A) and (D) components were added and kneaded using a twin screw extruder at 230° C. (provided that Example 3 was at 270° C.) to obtain a thermoplastic resin composition.

The evaluation results are shown in Table 1.

In Examples 1 to 7, the thermoplastic resin compositions of this invention were obtained which were as aimed at by this invention.

In Comparative Example 1, the (C) component was used in an amount smaller than the scope of this invention, and therefore, the impact resistance was inferior.

In Comparative Example 2, the (B) component was used in an amount larger than the scope of this invention, and therefore, the impact strength was inferior.

TABLE 1

| | Component | Unit | Example 1 | 2 | 3 | 4 | 5 | 6 | 7 | Comparative Example 1 | 2 | 3 | 4 |
|---|---|---|---|---|---|---|---|---|---|---|---|---|---|
| (A) | component content | % | | | | | | | | | | | |
| | (1) Rubber-modified styrene copolymer | | G-1 25 | G-2 25 | G-2 40 | G-1 30 | G-3 60 | G-2 26 | G-1 26 | G-1 25 | G-1 25 | G-4 25 | G-5 25 |
| | (2) Styrene copolymer | | M-1 40 | M-1 40 | M-1 34 | M-1 27 | — | M-1 30 | M-1 34 | M-1 45 | M-1 15 | M-1 40 | M-1 40 |
| (B) | component content | % | B-1 30 | B-1 30 | B-1 25 | B-1 40 | B-1 35 | B-1 35 | B-1 35 | B-1 30 | B-1 55 | B-1 30 | B-1 30 |
| (C) | component content | % | C-1 5 | C-1 5 | C-1 1 | C-1 3 | C-1 5 | C-1 9 | C-1 5 | C-1 0 | C-1 5 | C-1 5 | C-1 5 |
| (D) | component content | ppm | 500 | 1000 | 500 | 1000 | 500 | 1000 | 0 | 500 | 500 | 500 | 500 |
| [Physical property] | | | | | | | | | | | | | |
| (i) | Chemical resistance | | | | | | | | | | | | |
| | Chem. A | | A | B | B-C | A | A | A | A | A | A | A | A |
| | Chem. B | | A | B | B | A | A | A | A | A | A | A | A |
| (ii) | Impact resistance | kgf·cm | 100 | 100 | 180 | 100 | 110 | 90 | 80 | 10 | 40 | 40 | 50 |
| (iii) | Moldability | g/10-min | 16 | 13 | 11 | 15 | 15 | 10 | 15 | 20 | 16 | 18 | 8 |

EXAMPLES 8 TO 12 AND COMPARATIVE EXAMPLES 5 TO 9

(A) Component

The (A) component used in Examples 8 to 12 and Comparative Examples 5 to 9 was a mixture of (1) the following rubber-modified styrene polymer and (2) the following rubber-unmodified styrene polymer:

(1) Rubber-Modified Styrene Polymer

G-1: The same as in Examples 1 to 7.

G-6: AES resin consisting of 30% of EPDM containing ethylidene norbornene, 49% of styrene and 21% of acrylonitrile having a grafting degree of 50% and an intrinsic viscosity [η] 30° C. MEK of 0.5 dl/g.

G-7: AES resin consisting of 30% of hydrogenated styrene-butadiene block copolymer, 49% of styrene and 21% of acrylonitrile having a grafting degree of 50% and an intrinsic viscosity [η] 30° C. MEK of 0.5 dl/g.

(2) Rubber-Unmodified Styrene Polymer
M-1: The same as in Examples 1 to 7.

(B) Component
B-1: The same as in Examples 1 to 7.

(C) Component
C-1: The same as in Examples 1 to 7.
C-2: Copolymer of 60% of ethylene, 4.5% of maleic anhydride and 35.5% of ethyl acrylate.

(E) Component
PC-1: Aromatic polycarbonate, manufactured by Mitsubishi Gas Chemical Co., Ltd., IUPILON S2000

Evaluation Test Method (iv) Dimension Stability

The shrinkage (%) in the longitudinal direction of a molded article having a thickness of 2.4 mm, a length of 300 mm and a width of 50 mm was measured. However, the best value is 0.5%.

Appearance of Molded Article

A molded article having a film gate of 1 mm in thickness was visually judged in respect of appearance near the gate using the following ratings:
A: Good
B: Fairly good
C: Bad Each of the components indicated in Table 2 was used and a thermoplastic resin composition was prepared in the following manner:

First of all, the (B) and (C) components were kneaded using a single screw extruder at 230° C. to obtain pellets and then the pellets were mixed with the (A) component using a twin screw extruder at 230° C. to obtain a thermoplastic resin composition.

Incidentally, in Example 12, the (B) and (C) components were first kneaded using a single screw extruder at 230° C. to obtain pellets, and thereafter, the pellets and the (A) and (E) components were kneaded using a twin screw extruder at 230° C. to obtain a thermoplastic resin composition.

The evaluation results obtained are shown in Table 2.

In Examples 8 to 12, the thermoplastic resin compositions of this invention were obtained which were as aimed at by this invention.

In particular, in Example 12, the composition was excellent in dimension stability.

In Comparative Example 5, the (C) component was not used, and therefore, the appearance of molded article and the impact resistance were inferior.

In Comparative Example 6, the (C) component was used in an amount larger than the scope of this invention, the moldability and the impact resistance were inferior.

In Comparative Example 7, the (B) component was used in an amount smaller than the scope of this invention, and the (A) component was used in a proportion larger than the scope of this invention, and therefore, the chemical resistance was inferior.

In Comparative Example 8, the (B) component was used in an amount larger than the scope of this invention, and therefore, the impact resistance was inferior.

In Comparative Example 9, the (C) component was outside the scope of this invention, and therefore, the impact resistance was inferior.

TABLE 2

| | Component | Unit | Example 8 | 9 | 10 | 11 | 12 | Comparative Example 5 | 6 | 7 | 8 | 9 |
|---|---|---|---|---|---|---|---|---|---|---|---|---|
| (A) | component content | % | | | | | | | | | | |
| | (1) Rubber-modified styrene copolymer | | G-1 25 | G-6 40 | G-7 30 | G-1 25 | G-1 25 | G-1 25 | G-1 25 | G-1 30 | G-1 25 | G-1 25 |
| | (2) Rubber-unmodified styrene copolymer | | M-1 40 | M-1 40 | M-1 22 | M-1 30 | M-1 39 | M-1 45 | M-1 20 | M-1 62 | M-1 15 | M-1 40 |
| (B) | component content | % | B-1 30 | B-1 15 | B-1 45 | B-1 30 | B-1 30 | B-1 30 | B-1 30 | B-1 7 | B-1 55 | B-1 30 |
| (C) | component content | % | C-1 5 | C-1 5 | C-1 3 | C-1 15 | C-1 1 | C-1 0 | C-1 25 | C-1 1 | C-1 5 | C-2 5 |
| (E) | component content | % | 0 | 0 | 0 | 0 | 5 | 0 | 0 | 0 | 0 | 0 |
| [Physical property] | | | | | | | | | | | | |
| (i) | Chemical resistance | | | | | | | | | | | |
| | Chem. A | | A | B-C | A | A | A | A | A | D | A | A |
| | Chem. B | | A | B | A | A | A | A | A | D | A | A |
| (ii) | Impact resistance | kgf · cm | 100 | 110 | 95 | 110 | 130 | 10 | 20 | 70 | 50 | 15 |
| (iii) | Moldability | g/10-min | 16 | 20 | 15 | 15 | 14 | 20 | 5 | 20 | 16 | 16 |
| (iv) | Dimension stability | % | 0.65 | 0.65 | 0.75 | 0.70 | 0.55 | 0.60 | 0.70 | 0.55 | 0.75 | 0.65 |
| (v) | Appearance of molded article | | A | A | A | A | A-B | B | C | A | A | A |

Note:
Chemical resistance, impact resistance and moldability are the same as in Table 1.

What is claimed is:

1. A thermoplastic resin composition which comprises:
(A) 45–90% by weight of a mixture of rubber-unmodified styrene resin and at least 38% by weight, based on the weight of the (A) component, of a rubber-modified styrene polymer in which the rubber content is 5–40% based on the weight of component (A) and the rubber is selected from the group consisting of polybutadiene, styrene-butadiene copolymer, hydrogenated styrene-butadiene block copolymer, acrylic copolymer, ethylene-propylene copolymer, chlorinated polyethylene and polyurethane and in which the grafting component is at least one aromatic alkenyl compound alone or in combination with other copolymerizable monomers and the grafting degree is 40–150% by weight based on the weight of the rubber polymer, (B) 9.5-49% by weight of an aromatic polyester having an intrinsic viscosity of 1.1-2 dl/g as measured at 25° C. in o-chlorophenol which is a polyester of a diol and an aromatic dicarboxylic acid moiety, and (C) 0.5-6% by weight of a graft copolymer obtained by graft-copolymerizing a monomer mixture consisting of 60-80% by weight of an aromatic alkenyl compound and 20-40% by weight of an alkenyl cyanide compound on a copolymer consisting essentially of an olefin unit and an epoxy group-containing unsaturated compound unit in a weight ratio of 99.9/0.1-60/40.

2. The thermoplastic resin composition according to claim 1, where the proportion of the (A) component is 54-74.5% by weight, the proportion of (B) component is 25-40% by weight and the proportion of the (C) component is 0.5-6% by weight.

3. The thermoplastic resin composition according to claim 1, wherein (D) a silicone lubricant is further contained in a proportion of 5-20,000 ppm of the total weight of the (A), (B) and (C) components.

4. The thermoplastic resin composition according to claim 2, wherein (D) a silicone lubricant is further contained in a proportion of 5-20,000 ppm of the total weight of the (A), (B) and (C) components.

5. The thermoplastic resin composition according to claim 1, wherein the rubber is polybutandiene.

6. The thermoplastic resin composition according to claim 1, wherein the rubber-modified thermoplastic styrene resin is selected from the group consisting of acrylonitrile-butadiene-styrene resin, acrylonitrile-ethylene-propylene-styrene resin, methyl methacrylate-butadiene-styrene resin, acrylonitrile-butadiene-methyl methacrylate-styrene resin, acrylonitrile-n-butylacrylate-styrene resin, butadiene-styrene resin, acrylonitrile-butadiene-$\alpha$-methylstyrene-styrene resin and acrylonitrile-hydrogenated styrene-butadiene block copolymer-styrene resin.

7. The thermoplastic resin composition according to claim 1, wherein the rubber-unmodified styrene polymer is a polymer of at least one monomer selected from the group consisting of styrene, $\alpha$-methylstyrene and bromostyrene.

8. The thermoplastic resin composition according to claim 7, wherein the polymer is of at least one monomer selected from the group consisting of styrene and $\alpha$-methylstyrene.

9. The thermoplastic resin composition according to claim 7, wherein the rubber-unmodified styrene polymer is a copolymer of styrene and at least one member of the group consisting of acrylonitrile, methacrylonitrile, methyl methacrylate, N-cyclohexyl-maleimide and N-phenylmaleimide.

10. The thermoplastic resin composition according to claim 9, wherein the copolymer is of styrene and acrylonitrile.

11. The thermoplastic resin composition according to claim 1, wherein the grafting degree of the rubber-modified thermoplastic styrene resin is 60-120%.

12. The thermoplastic resin composition according to claim 1, wherein the aromatic dicarboxylic acid is selected from the group consisting of naphthalene dicarboxylic acid, terephthalic acid, and isophthalic acid, and derivative thereof capable of forming the ester.

13. The thermoplastic resin composition according to claim 1, wherein the diol is selected from the group consisting of polymethylene glycol having 2 to 6 carbon atoms, 1,4-cyclohexanediol and bisphenol-A and derivatives thereof capable of forming the ester.

14. The thermoplastic resin composition according to claim 1, wherein the aromatic polyester is selected from the group consisting of polyethylene terephthalate, polybutylene terephthalate and bisphenol A isophthalate.

15. The thermoplastic resin composition according to claim 14, wherein the aromatic polyester is polyethylene terephthalate.

16. The thermoplastic resin composition according to claim 1, wherein the intrinsic viscosity of the aromatic polyester is 1.1-1.4 dl/g.

17. A process for producing the thermoplastic resin composition of claim 1, which comprises previously mixing a part or the whole of the (B) component and a part or the whole of the (C) component and 0-20% by weight of the (A) component, and then mixing the resulting mixture with the remaining component or components.

18. The thermoplastic resin composition according to claim 1, wherein the weight ratio of the rubber-modified grafted thermoplastic resin to the rubber-unmodified resin in the (A) component is 38/62-95/5.

19. The thermoplastic resin composition according to claim 1, wherein the weight ratio of the rubber-modified grafted thermoplastic resin to the rubber-unmodified styrene resin in the (A) component is 38/62-90/10.

20. The thermoplastic resin composition according to claim 1, wherein the weight ratio of the rubber-modified grafted thermoplastic resin to the rubber-unmodified styrene resin in the (A) component is 38/62-70/30.

21. The thermoplastic resin composition according to claim 1, wherein the grafting component in the (A) component is a combination of an aromatic alkenyl compound with an alkenyl cyanide compound.

22. The thermoplastic resin composition according to claim 21, wherein the weight ratio of the aromatic alkenyl compound to the alkenyl cyanide compound is 60/40-90/10.

23. The thermoplastic resin composition according to claim 21, wherein the weight ratio of the aromatic alkenyl compound to the alkenyl cyanide compound is 65/35-85/15.

24. The thermoplastic resin composition according to claim 1, wherein the amount of the rubber in the (A) component is 10-30% by weight.

25. The thermoplastic resin composition according to claim 1, wherein the grafting degree of the rubber-modified grafted thermoplastic styrene resin is 45-140% by weight based on the weight of the rubber polymer.

26. The thermoplastic resin composition according to claim 1, wherein the grafting degree of the rubber-modified grafted thermoplastic styrene resin is 50-120% by weight based on the weight of the rubber polymer.

27. The thermoplastic resin composition according to claim 1, wherein the weight ratio of the olefin component to the epoxy group-containing unsaturated compound in the (C) component is 97/3-70/30.

* * * * *